United States Patent [19]
Ishimoto et al.

[11] Patent Number: 5,970,432
[45] Date of Patent: Oct. 19, 1999

[54] APPARATUS AND METHOD FOR MEASURING DISPLACEMENT

[75] Inventors: Shigeru Ishimoto; Toyohiko Matsuda, both of Yokohama, Japan

[73] Assignee: Sony Precision Technology Inc., Tokyo, Japan

[21] Appl. No.: 08/922,527

[22] Filed: Sep. 3, 1997

[30] Foreign Application Priority Data

Sep. 3, 1996 [JP] Japan .................................... 8-233459

[51] Int. Cl.⁶ ........................................................ G01B 7/00
[52] U.S. Cl. ............................ 702/155; 702/94; 702/150; 702/158; 364/182; 364/474.35
[58] Field of Search ..................... 702/155, 158, 702/166, 94, 168, 174, 150; 324/207.12, 207.23, 207.24, 239, 207.13; 364/182, 474.35

[56] References Cited

U.S. PATENT DOCUMENTS

| | | | |
|---|---|---|---|
| 4,131,838 | 12/1978 | Etoh et al. ............................... | 318/603 |
| 4,309,702 | 1/1982 | Mibu et al. ........................ | 324/207.13 |
| 4,676,645 | 6/1987 | Taniguchi et al. ....................... | 356/356 |
| 4,728,194 | 3/1988 | Mori et al. ............................... | 356/358 |
| 4,785,181 | 11/1988 | Kimizuka et al. ....................... | 250/237 |
| 5,299,143 | 3/1994 | Hellinga et al. ......................... | 702/158 |
| 5,432,443 | 7/1995 | Maejima et al. .................... | 324/207.24 |
| 5,461,311 | 10/1995 | Nakazano et al. ....................... | 702/166 |
| 5,663,643 | 9/1997 | Matuyama .......................... | 324/207.12 |

*Primary Examiner*—John Barlow
*Assistant Examiner*—Hien Vo
*Attorney, Agent, or Firm*—Foley & Lardner

[57] ABSTRACT

In apparatus and method for measuring a displacement of an object to be measured, a magnitude of the displacement is derived on the basis of a difference in periods of a phase modulated signal and a reference signal, a ratio between the periods of a basic clock and of an interpolation clock which is varied according to the magnitude of the displacement, a clock signal whose period is a multiplication of a period of the basic clock by the ratio as a multiplier, a pulse train signal is created whose number of pulses are given by the magnitude of the displacement and supplied to an A/B phase converter.

16 Claims, 9 Drawing Sheets

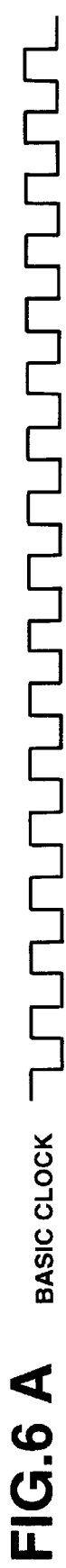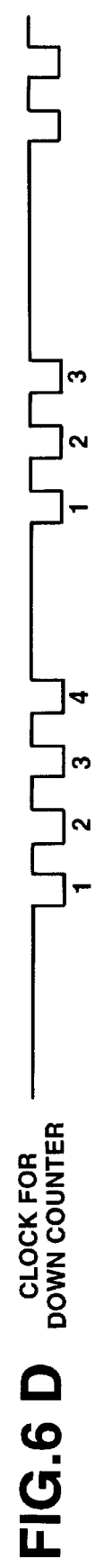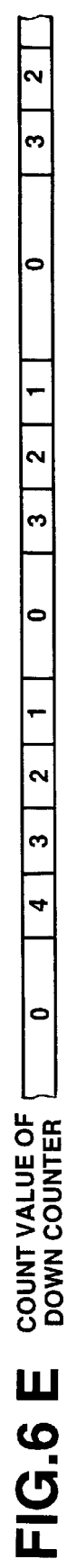
FIG.6 A  BASIC CLOCK
FIG.6 B  PRESET INSTRUCTION (DATA)
FIG.6 C  BORROW SIGNAL
FIG.6 D  CLOCK FOR DOWN COUNTER
FIG.6 E  COUNT VALUE OF DOWN COUNTER

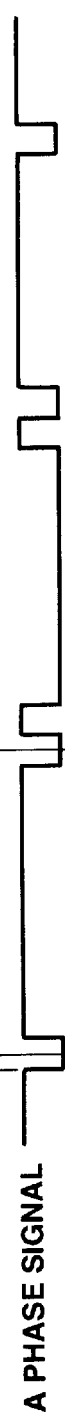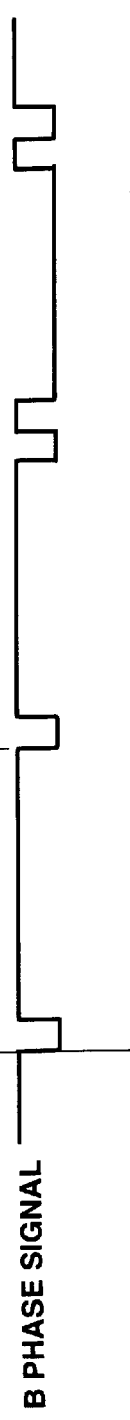
FIG.7 A  PHASE MODULATED SIGNAL
FIG.7 B  DISPLACEMENT
FIG.7 C  CLOCK CP TO A/B PHASE CONVERTER
FIG.7 D  A PHASE SIGNAL
FIG.7 E  B PHASE SIGNAL

PHASE MODULATED SIGNAL

REFERENCE SIGNAL

PERIOD a OF THE REFERENCE SIGNAL

PERIOD b OF THE MODULATED SIGNAL

DISPLACEMENT | a - b |

PHASE MODULATED SIGNAL

REFERENCE SIGNAL

PERIOD b OF THE MODULATED SIGNAL

PERIOD a OF THE REFERENCE SIGNAL

DISPLACEMENT | a - b |

FIG.10

ROM TABLE

| B \ A | 0 | 1 | 2 | 3 | 4 | 5 | 6 | 7 | 8 | 9 | 10 |
|---|---|---|---|---|---|---|---|---|---|---|---|
| 10 | F | 10 | 5 | 3 | 2 | 2 | 1 | 1 | 1 | 1 | 1 |
| 9 | F | 9 | 4 | 3 | 2 | 1 | 1 | 1 | 1 | 1 | 0 |
| 8 | F | 8 | 4 | 2 | 2 | 1 | 1 | 1 | 1 | 0 | 0 |
| 7 | F | 7 | 3 | 2 | 1 | 1 | 1 | 1 | 0 | 0 | 0 |
| 6 | F | 6 | 3 | 2 | 1 | 1 | 1 | 0 | 0 | 0 | 0 |
| 5 | F | 5 | 2 | 1 | 1 | 1 | 0 | 0 | 0 | 0 | 0 |
| 4 | F | 4 | 2 | 1 | 1 | 0 | 0 | 0 | 0 | 0 | 0 |
| 3 | F | 3 | 1 | 1 | 0 | 0 | 0 | 0 | 0 | 0 | 0 |
| 2 | F | 2 | 1 | 0 | 0 | 0 | 0 | 0 | 0 | 0 | 0 |
| 1 | F | 1 | 0 | 0 | 0 | 0 | 0 | 0 | 0 | 0 | 0 |
| 0 | F | 0 | 0 | 0 | 0 | 0 | 0 | 0 | 0 | 0 | 0 |

A, LOWER DIGIT ADDRESS : DIVISOR

B, UPPER DIGIT ADDRESS : DIVIDERD

APPARATUS AND METHOD FOR MEASURING DISPLACEMENT

BACKGROUND OF THE INVENTION a) Field of the Invention

The present invention relates to apparatus and method for detecting (measuring) a displacement.

b) Description of the Related Art

Each of U.S. Pat. Nos. 4,676,645 and 5,432,443 exemplifies an optical or magnetic instrument for measuring a displacement of an object to be measured.

In a previously proposed displacement measuring instrument, two equilibrium modulated signals representing a result of displacement measurement are converted into a phase modulated signal, a period of the phase modulated signal being compared with that of a reference signal so as to detect the displacement of the measured object.

That is to say, a difference in period of both phase modulated signal and reference signal represents the displacement of the measured object.

In order to improve an accuracy of detection of the displacement, an interpolation processing is executed.

Previously proposed methods of outputting an interpolation data include: an outputting method of a clock pulse and a direction discrimination signal and an outputting method using a two-bit Gray code (A/B phase).

In the latter method, the interpolated displacement is achieved for each period of the phase modulated signal. When the displacement is equal to one or less, the A/B phase is varied at a period of the phase modulated signal multiplied by an integer. When the displacement is equal to two or more, the A/B phase is varied at a period of a clock inputted into a pulse train converter.

The clock inputted into the pulse train converter is set such that a frequency of the clock is set to that of the pulse modulated signal multiplied by several tens, namely, a period of the clock is set to that of the pulse modulated signal multiplied by several tenths.

However, if a movement speed of a scale used to measure the displacement of the object to be measured exceeds a certain speed, a period of the clock pulse is abruptly short, and a phase difference time of the A/B phase signal is abruptly short, and a higher frequency clock is furthermore needed.

In the case where the clock pulse and direction discrimination signal are outputted and the movement speed exceeds a certain speed and the movement speed of the scale exceeds the certain speed, the period of the clock pulse needs to be made shorter so that a processing capability more than necessary is required for a receiving side of the clock pulse and direction discrimination signal.

On the other hand, in the case where the A/B phase signal is outputted and the movement speed of the scale exceeds the certain speed so that the phase difference time of the A/B phase signal becomes shorter, the processing capability more than necessary is required for the receiving side of the clock pulse and direction discrimination signal.

Consequently, a cost of the whole system of the displacement measuring instrument is increased.

SUMMARY OF THE INVENTION

It is, therefore, an invention to provide apparatus and method for measuring a displacement which can achieve a reduction in a whole system cost without changing a basic clock signal frequency.

According to one aspect of the present invention, there is provided with a displacement measuring apparatus comprising:

a) a reference signal generator for generating a reference signal;

b) a displacement sensor for generating a displacement signal indicative of a relative displacement of an object to be measured to a reference position at which the reference signal generator generates the reference signal indicating the reference position;

c) a phase modulated signal generator for generating a phase modulated signal indicating a phase difference between the displacement signal generated by the displacement sensor and the reference signal generated by the reference signal generator, the phase difference representing the displacement of the object to be measured with respect to the reference position;

d) a subtractor for subtracting a period of the phase modulated signal which is converted into a number of pulses of an interpolation clock from that of the reference signal which is converted into the number of pulses of the interpolation clock so as to output a direction signal indicating a direction to which the object to be measured is displaced and output a magnitude of the displacement signal indicating the magnitude of the displacement and which is converted into the number of pulses of the interpolation clock;

e) a basic clock generator for generating a basic clock having a predetermined period;

f) a divider for dividing the period of at least one of either the reference signal or the phase modulated signal which is converted into the number of pulses of the basic clock by the magnitude of the displacement signal which is converted into the number of pulses of the basic clock so as to output a multiplier representing the number of pulses of the basic clock per pulse of the interpolation clock;

g) a clock pulse generator for generating a clock pulse having a period corresponding to that of the basic clock multiplied by the multiplier outputted by the divider on the basis of the multiplier; and h) a pulse train converter for receiving the magnitude of the displacement signal from the subtractor and for outputting a pulse train signal whose period is derived on the basis of the clock pulse supplied from the clock pulse generator and the magnitude of the displacement signal.

According to another aspect of the present invention, there is provided with a method of measuring a displacement of an object to be measured comprising the steps of:

a) generating a reference signal;

b) generating a displacement signal indicative of a relative displacement of the object to be measured to a reference position at which the reference signal indicating the reference position is generated;

c) generating a phase modulated signal indicating a phase difference between the displacement signal and the reference signal generator, the phase difference representing the displacement of the object to be measured with respect to the reference position;

d) subtracting a period of the phase modulated signal which is converted into a number of pulses of an interpolation clock from that of the phase modulated signal which is converted into the number of pulses of the interpolation clock so as to output a direction signal indicating a direction to which the object to be measured is displaced and output a magnitude of the displacement signal indicating the magnitude of the displacement and which is converted into the number of pulses of the interpolation clock;

e) generating a basic clock having a predetermined period;

f) dividing the period of at least one of either the reference signal or the phase modulated signal which is converted into the number of pulses of the basic clock by the magnitude of the displacement signal which is converted into the number of pulses of the basic clock so as to output a multiplier representing the number of pulses of the basic clock per pulse of the interpolation clock;

g) generating a clock pulse having a period corresponding to that of the basic clock multiplied by the multiplier outputted by the divider on the basis of the outputted multiplier; and h) receiving the magnitude of the displacement signal derived at the step d) and for outputting a pulse train signal on the basis of the clock pulse generated at the step g).

BRIEF DESCRIPTION OF THE DRAWINGS

FIGS. 6A through 6E are integrally a timing chart of each signal for explaining the operation of the comparative example shown in FIG. 5.

FIGS. 7A through 7E are integrally a timing chart for explaining the operation of the comparative example shown in FIG. 5.

FIG. 10 is an explanatory view for explaining a ROM table applicable to a divider shown in FIGS. 1 and 3.

BEST MODE FOR CARRYING OUT THE INVENTION

Reference will hereinafter be made to the drawings in order to facilitate a better understanding of the present invention.

Before explaining a first preferred embodiment of a displacement measuring apparatus according to the present invention, a comparative example of the displacement measuring apparatus will be described below with reference to FIGS. 5, 6 (A) through 6 (E), 7, 8 (A), 8 (B), 9 (A), and 9 (B).

Figure 8:
FIGS. 8A and 8B and 9A and 9B are integrally a signal waveform chart for explaining a displacement.
Figure 8:
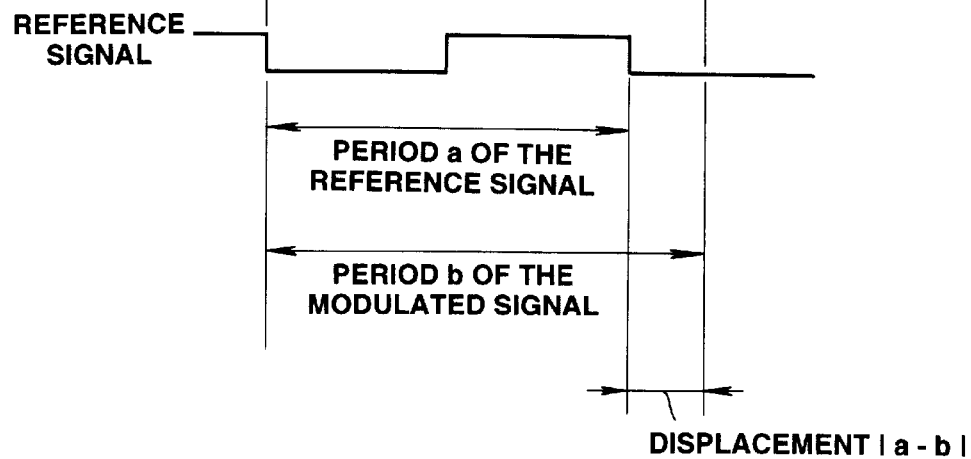
Figure 9:
Figure 9:
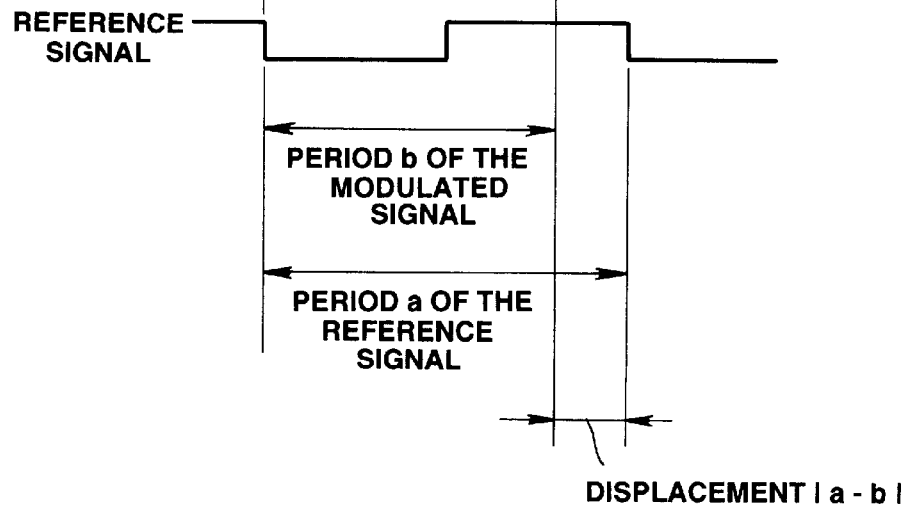

First, FIGS. 8 (A) and 8 (B) are, integrally, a case where a period of a pulse modulated signal is longer than that of a reference signal and FIGS. 9 (A) and 9 (B) are, integrally, a case where the period of the pulse modulated signal is shorter than that of the reference signal.

A difference between the periods of the phase modulated signal and that of the reference signal represents the displacement of an object to be measured.

Figure 5:
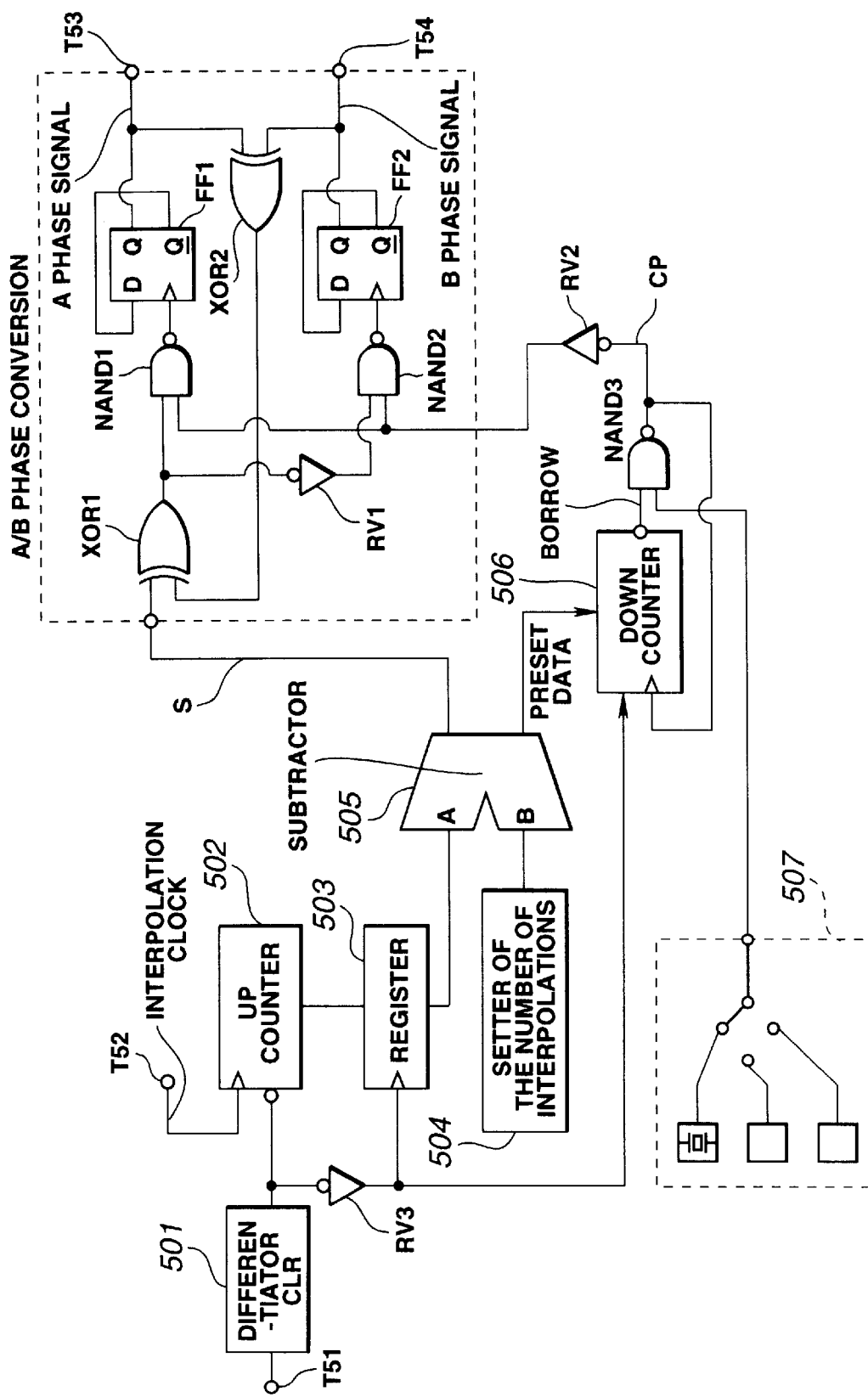
FIG. 5 is a circuit block diagram of a comparative example to the first embodiment shown in FIG. 1.

FIG. 5 shows the comparative example of an interpolation processing displacement measuring apparatus.

The phase modulated signal inputted at a terminal T51 is differentiated by means of a differentiator 501. The differentiator 501 outputs a pulse on a falling edge of the phase modulated signal to a clear end of an up counter 502, the pulse being inverted by an inverter RV3 and applied to a register 503 and to a preset instruction input end of a (shift) register 503 and a down counter 506.

The up counter 502 counts incrementally the number of interpolation clock pulses inputted at a terminal T52 after a clear of the pulse inputted from the differentiator 501 and until the subsequent clear is made.

The register 503 latches the counted number of the interpolation clock pulses by means of the up counter 502.

Hence, the number of the interpolation clocks counted by the up counter 502 represents a value of the period of the pulse modulated signal divided by the period of the interpolation clock.

In other words, the period of the pulse modulated signal is represented by the number of pulses of the interpolation clock.

An interpolation number setter 504 sets a number of interpolations.

In this comparative example, the number of interpolations is a value of (for example, 200/1=200) the period of a reference signal (for example, 20 milliseconds) divided by the period (for example, 0.1 microseconds) of the interpolation clock period.

A subtractor 505 with a sign receives a signal A supplied from the register 503 (phase modulation signal period÷interpolation clock period, for example, 22 $\mu$sec.÷0.1 $\mu$sec.=220) and a signal B (period of the reference signal÷period of the interpolation clock, in this example, 200) supplied from the setter 504 so as to subtract the signal B from the signal A, outputting a direction signal S (indicating a direction of the displacement of the object to be measured) and a displacement indicative signal (|A−B|, in this example, 220−200=20).

The displacement indicative signal indicates the displacement in a form of the number of pulses of the interpolation clock.

A down counter 506 is provided with an input terminal receiving the preset instruction, an input terminal receiving a preset data, an input terminal receiving the clock signal, and an output terminal outputting a borrow signal.

The down counter 506 sets therein the displacement indicative signal (|A−B|, in this example, 20) in the form of the number of pulses from the subtracter 505 with the sign when the active signal from the inverter RV3 is applied to its preset instruction terminal 506 as a count value and turns on the borrow signal to be active.

The active borrow signal is inputted at one input end of a gate circuit, i.e., a NAND 3 so as to control a passage of a clock signal applied to the other input end of the gate circuit NAND 3.

An operation of the down counter 506 will briefly be described with reference to FIGS. 6 (A) through 6 (E).

Suppose that a value of the preset data is sequentially, 4, 3, and 3, as shown in FIG. 6 (B).

The inverted signal inverted through the inverter RV3 and differentiated by the differentiator 501 represents a point of a time at which the phase modulated signal falls. Hence, this point of the time indicates an end of a certain period of the phase modulated signal and also indicates a start of the period subsequent to the certain period so that the preset instruction to the down counter 506 is issued at the start of every period of the phase modulated signal. The down counter 506, upon the receipt of the preset instruction, presets the received preset data internally and turns on the borrow signal so as to become active, as shown in FIGS. 6 (B) and 6 (C).

When the borrow signal is turned on (active), the gate circuit of NAND 3 is opened, the basic clock being supplied from a clock pulse generator 507 being supplied to an A/B phase converter denoted by a dotted line of FIG. 5. The turned on borrow signal is also supplied to the down counter 506 to count down the preset value (in this example, four).

This is appreciated from FIGS. 6 (D) and 6 (E).

As shown in FIGS. 6 (D) and 6 (E), when the preset data indicates four, the number of pulses of the basic clock passed through the gate circuit of NAND 3, the down counter counts the number of pulses by four and the contents of the down counter 506 is varied as 4, 3, 2, 1, and 0. When the count value of the counter 506 has reached to zero, the borrow signal is turned off so that the gate circuit NAND 3 stops the passage of the basic clock pulses. Thereafter, when the next preset data (displacement indicative signal) (in this example, three) is preset in the down counter 506, the same operation is repeated.

Although the magnitude of the displacement is represented by the number of interpolation clock pulses, the down counter 506 is synchronized with the basic clock. Hence, the clock supplied to the A/B phase converter through the gate circuit of NAND 3 is the clock pulses having the same number as the number of the pulses in the interpolation clock corresponding to the magnitude of the displacement and having the period of the basic clock.

The A/B phase converter includes: first and second flip-flops FF1 and FF2, gate circuits NAND 1 and NAND 2, exclusive OR gates XOR 1 and XOR 2, and an inverter RV1. The direction discrimination signal S is inputted to one input end of the XOR 1 and an output end of the XOR 1 is directly inputted to one input end of the gate circuit NAND 1 and to one input end of the gate circuit NAND 2 via the inverter RV1. The other input ends of the NAND 1 and NAND 2 receive the clock pulses passed through the NAND 3. The other input ends of NAND 1 and NAND 2 receive the clock pulses passed through the NAND 3. The received clock pulses serve to invert status of either the flip-flop FF1 or FF2 via a corresponding gate opened according a plurality of the direction discrimination signal.

An Q output of each of the first and second flip-flops FF1 and FF2 is supplied to a corresponding one of output terminals T53 and T54 as the A phase signal or as the B phase signal.

In addition, the Q outputs of the flip-flops FF1 and FF2 are inputted at input ends of the XOR 2 and an output end of the XOR 2 is connected to the other input end of the XOR 1.

The clock pulses supplied to the A/B phase converter from the gate circuit NAND 3 via the inverter RV2 are passed alternatingly through the gate circuits NAND 1 and NAND 2 to invert the status of each flip-flop FF1 and FF2 and to output alternatingly inverted A phase signal or B phase signal to the corresponding one of the output terminals T53 and T54.

FIGS. 7 (C), 7 (D), and 7 (E) show the clock input CP in the A/B phase converter, A phase signal, and B phase signal in the comparative example shown in FIG. 5.

If the magnitude of displacement is four, the number of pulses in the clock supplied to the A/B phase converter via the inverter RV2 are four. When the Q output of the first flip-flop FF1 is inverted in response to the input of the first pulse of the clock pulses (4), the A phase signal is turned at an "L" (low) level. When the second flip-flop FF2 is, in turn, inverted in response to the next second pulse of the inputted clock, the B phase signal is turned to an "H" (high) level. When the first flip-flop FF 1 is again inverted in response to the next third pulse of the input clock, the A phase signal is turned to an "H" (high) level. When the last fourth pulse is inputted, the second flip-flop FF2 is inverted so that the B phase signal is turned to the "H" level. Thereafter, the Q outputs of the flip-flops FF1 and FF2 are not changed until the arrival of the next period of the clock pulses.

Figure 1:
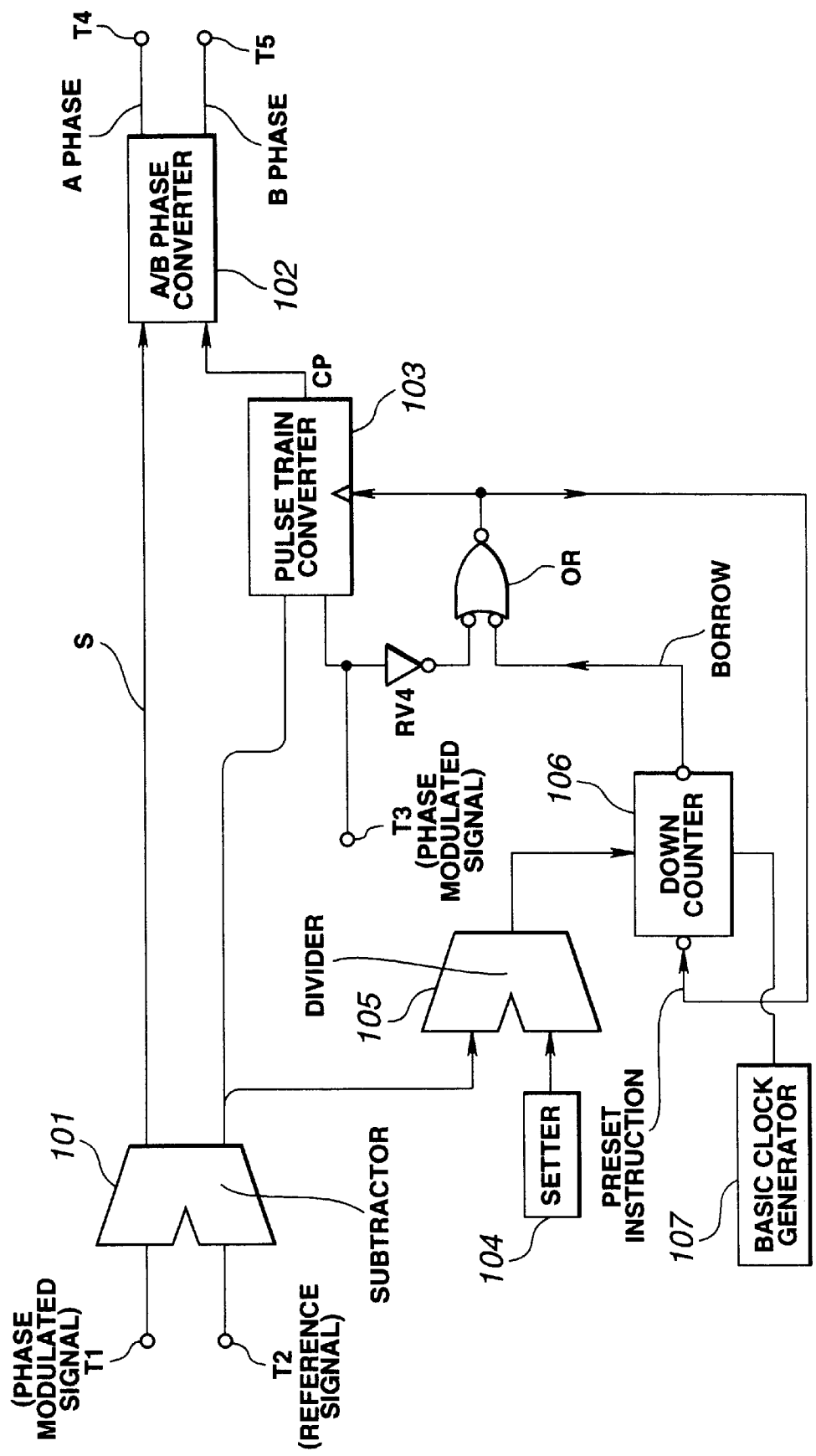
FIG. 1 is a circuit block diagram of a first preferred embodiment of a displacement apparatus according to the present invention.

Next, FIG. 1 shows a first preferred embodiment of a displacement measuring apparatus according to the present invention.

In FIG. 1, the subtractor 101 corresponds to the subtractor 505 in FIG. 5.

At one input terminal T1, the period of the phase modulated signal converted into the number of pulses of the interpolation clock is supplied to one input terminal T1. At the other input terminal T2, the period of a reference signal converted into the number of pulses of the interpolation clock is supplied to the other input terminal T2. The subtractor 101 outputs the direction discrimination signal S indicating the direction of the displacement of an object to be measured (normally, left or right) and outputs the displacement indicative signal converted into the number of pulses of the interpolation clock.

The displacement indicative signal is supplied to a pulse train converter 103 and to one input end of a divider 105. The other input end of the divider 105 receives a signal from a setter 104.

In the first embodiment, a value of the period of the pulse modulated signal (for example, 1 msec.=1000 $\mu$sec.) divided by the period of the basic clock (for example, 1 $\mu$sec.) is set in the setter 104 (in this case, 1000).

In other words, the setter 104 sets a length of the period of the phase modulated signal converted into the number of pulses in the basic clock.

The divider 105 divides the set value (1000) by the displacement indicative signal (for example, 2), a quotient (in this case, 500) being preset to a down counter 106.

In other words, the divider 105 divides the period of the phase modulated signal converted into the number of pulses of the basic clock which is the set value of the setter 104 by the displacement indicative signal which is the difference between the periods of the phase modulated signal and the reference signal converted into the number of pulses of the interpolation clock so as to calculate the number of pulses of the basic clock per one interpolation clock pulse. The number of pulses of the basic clock per one interpolation clock pulse are calculated on a preset value to a down counter 106.

The first preset of the down counter 106 is carried out when a differentiated value indicative signal on a falling edge of the pulse modulated signal inputted to a terminal T3 is inverted by an inverter RV4 and is inputted into a preset instruction end of the down counter 106 through an OR gate OR. The preset is carried out at the next time whenever the borrow signal is outputted.

A clock signal is supplied from a basic clock generator 107 to the down counter 106 so that a preset value is decrementally counted. Hence, a borrow output signal of the down counter 106 is a clock having a period such that the period of the basic clock is multiplied by the preset value and is a clock having the period of the interpolation clock.

The output of the OR gate OR which is a logical sum of the differentiated pulse of the pulse modulated signal and of the borrow output of the down counter 106 is supplied to the pulse train converter 103.

Together with the application of the pulse indicating the falling edge of the pulse modulated signal to the input end of the pulse train converter 103, the number of pulses representing the displacement supplied from the subtractor 305 are set. Hence, the pulse train converter 103 develops the output pulse train whose number of pulses are in accordance with the clock.

FIGS. 2A through 2E show the respective waveform charts for explaining the operation of the displacement measuring apparatus in the first preferred embodiment according to the present invention.

When the differential pulse created on each falling edge of the phase modulated signal at the input terminal T3 shown in FIG. 1 has arrived at a time point t1, a pulse is outputted at an output end of the OR gate OR shown in FIG. 1 so that the preset instruction is issued by the down counter 106. The down counter 103, in response to the preset instruction, sets a preset data supplied at this time into the counter itself 103.

Figure 2:
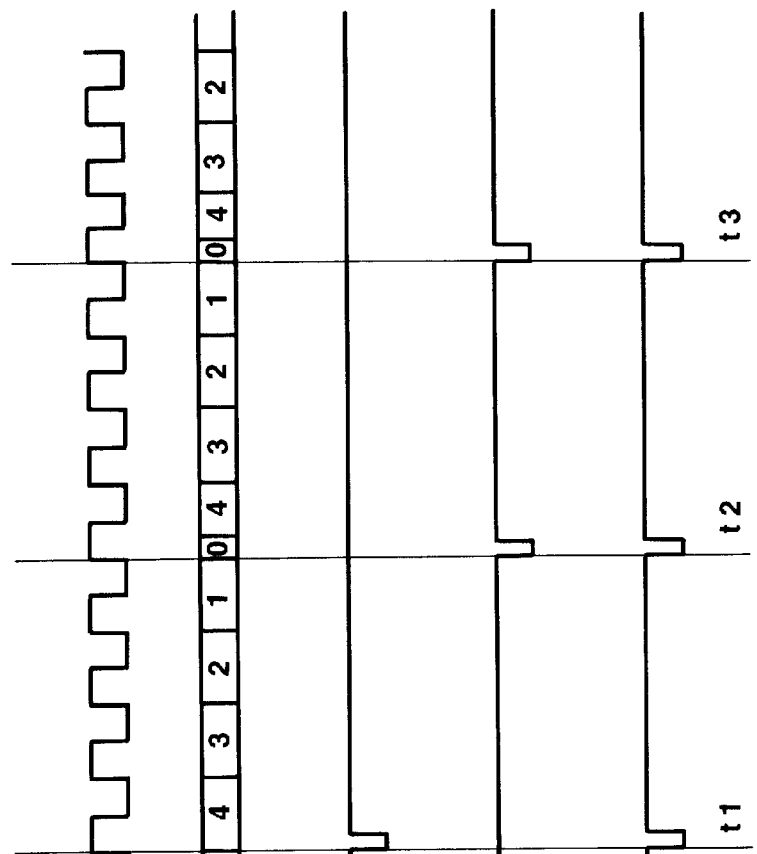
FIGS. 2A, 2B, 2C, 2D, and 2E are integrally a signal timing chart for explaining an operation of the first embodiment shown in FIG. 1.

It is noted that, in the example of FIGS. 2A through 2E, the value of the preset data is four for explanation purpose as shown in FIG. 2B.

After the time point t1, the down counter 103 creates the number of pulses of the basic clock supplied from the basic clock generator 107 so that the count value of the down counter 103 is varied as 3, 2, 1, and 0.

When the count value of the down counter 103 indicates zero at a time point t2, the borrow signal is outputted at an output end of the counter 106 so that the pulse of the preset instruction is again outputted at the output end of the OR gate OR.

Since the pulse is applied to the preset end of the down counter 106, the preset data at this time is set into the down counter 106. Namely, the count value of the counter indicates four. Thereafter, the same operation is repeated. It is of course the case that if the present value is varied, the numerical value set in the counter 106 is also varied.

As appreciated from the above explanation, in the first preferred embodiment according to the present invention, the clock such that a period of a clock signal supplied from the basic clock generator 107 multiplied by the preset data is created and is supplied to the pulse train converter 103 via the OR gate. On the other hand, in the comparative example of FIG. 5, the period of the clock signal generated in the basic clock generator 507 is changed and is supplied to the pulse train converter (A/B phase converter).

The first embodiment of the displacement measuring apparatus permits the pulse having the period of the basic clock (for example, 1 $\mu$sec.) multiplied by the preset data (500) for each period of the phase modulated signal to be achieved and the period of the pulse can be varied according to the number of pulses outputted as the displacement.

Consequently, an average pulse within the period of the phase modulated signal can be obtained.

It is noted that if the period b of the phase modulated signal is considerably shorter than that a of the basic clock signal as shown in FIGS. 9A and 9B, the pulse train converter 103 fails to output the pulse train and to set the next data so that a defect of data occurs.

This is supposed that the period of the pulse modulated signal becomes short due to a continuous movement of a displacement sensor (not shown).

Suppose that the period a of the basic clock signal is 20 $\mu$sec. And the number of the interpolations are 400. In this case, it is necessary to select the period of the interpolation clocks as 20 $\mu$sec.÷400=0.05 $\mu$sec.

If the period b of the pulse modulated signal is 18 $\mu$sec., the displacement gives (20 $\mu$sec.−18 $\mu$sec.)÷0.05 $\mu$sec.(=40).

If the period of the basic clock is 0.1 $\mu$sec., the value set in the setter 104 gives 20 $\mu$sec.÷0.1 $\mu$sec.=200 and the result of division at the divider 105 indicates 200÷40(=5).

The result of division is set in the down counter 106 shown in FIG. 1 and is decrementally counted according to the basic clock signal thereat.

When the count value has reached to zero, the borrow signal is outputted so that the period of the clock signal supplied to the pulse train converter 103 via the OR gate shown in FIG. 1 is 0.1 $\mu$sec.×5=0.5 $\mu$sec.

If the pulse train is outputted from the pulse train converter 103 under the above-described situation, a time of 0.5 $\mu$sec.×39=19.5 $\mu$sec. representing the displacement is needed.

However, since the period of the phase modulated signal is 18 $\mu$sec., which is shorter than the time, i.e., 19.5 $\mu$sec., the pulse train converter cannot output the required number of pulses if the next period of the phase modulated signal is 18 $\mu$sec.

Figure 3:
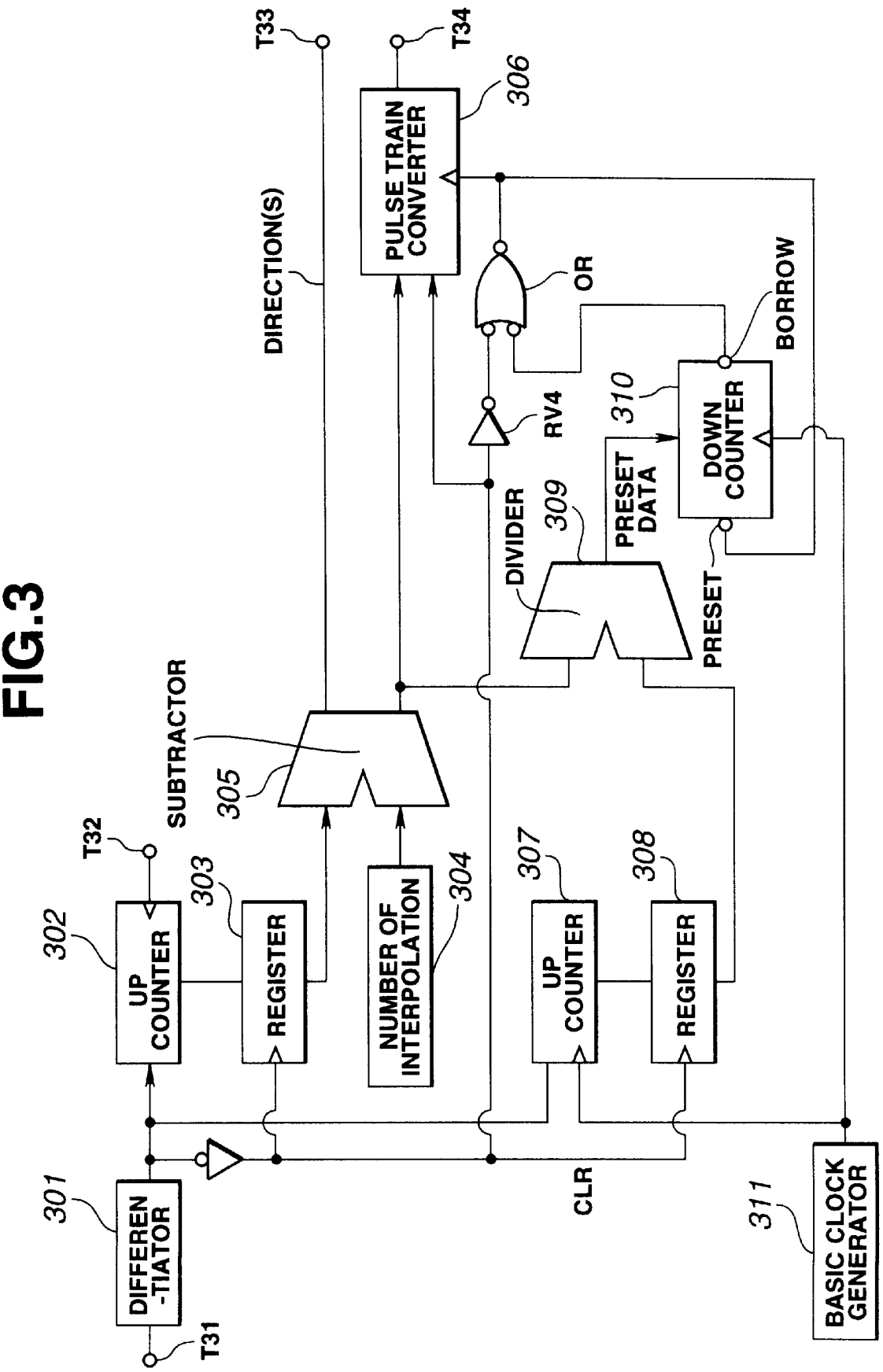
FIG. 3 is a circuit block diagram of a second preferred embodiment of the displacement apparatus according to the present invention.

FIG. 3 shows a second preferred embodiment of the displacement measuring apparatus according to the present invention.

To improve the above-described inconvenience in the first embodiment, the second embodiment shown in FIG. 3 is conceived.

In the second embodiment, the period of the phase modulated signal can be derived as a multiplier of the basic clock period.

Although a dividend of the divider 105 which determines the period of the pulse train is fixed in the first embodiment, the value of the dividend is varied for each period of the phase modulated signal.

This means that even if the period of the phase modulated signal becomes considerably short or longer, the number of pulses whose output values are variable within the period of the phase modulated signal can be achieved.

Next, the operation in the second embodiment shown in FIG. 3 will be described with reference to FIGS. 4A through 4G.

The differentiator 301, the up counter 302, the register 303, the interpolation number setter 304, and the subtractor 305 with the sign discriminator corresponds to those 501, 502, 503, 504, and 505 shown in FIG. 5. The detailed description will be omitted here.

In addition, the divider 309, the down counter 310, the basic clock generator 311, the pulse train converter 306, the inverter RV4, and OR gate OR correspond to those of 105, 106, 107, 103, RV4, and OR. The detailed description thereof will be omitted here.

The difference point between the first embodiment described with reference to FIG. 1 and the second embodiment described with reference to FIG. 3 is a circuit portion having a counter 307 and a register 308.

This combination of the circuits 307 and 308 corresponds to the setter 104 shown in FIG. 1, outputting the ratio between those periods of the reference signal and the basic clock.

Although the ratio is fixed in the circuitry shown in FIG. 1, the ratio in the case of the circuitry shown in FIG. 3 is variable.

That is to say, as shown in FIG. 3, a signal from the differentiator 301 is applied to the clear input end of the up counter 307. Since the signal which is inverted from the differentiator 301 is applied to the register 308, the register 308 latches the number of pulses of the basic clock corresponding to one period of the pulse modulated signal.

The uppermost portion of FIG. 4A indicates the pulse modulated signal inputted to the input terminal T31 of FIG. 3.

Figure 4:
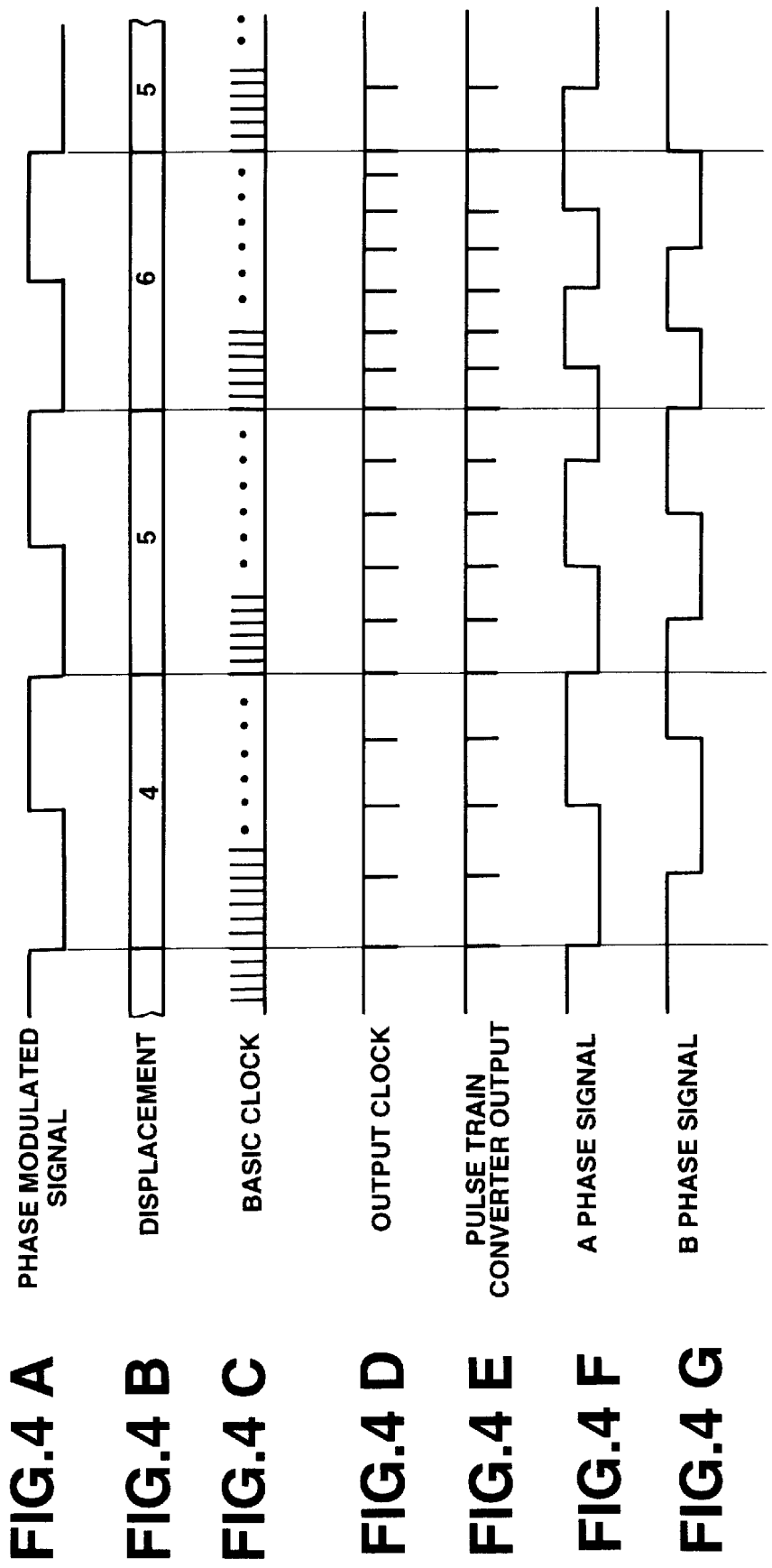
FIGS. 4A through 4G are integrally a timing chart of each signal in the second embodiment shown in FIG. 3 for explaining the operation of the displacement apparatus in the second embodiment shown in FIG. 3.

The displacement at the second stage of FIG. 4B indicates the output of the subtractor 305 and the output signal waveform shown in FIG. 4 B indicates the output of the subtractor 305 and the output signal waveform shown in FIG. 4C indicates the output signal of the basic clock generator 311. The quotient of the basic clock divided by the displacement is set to the down counter 310 of FIG. 3. Hence, the clock shown in the fourth stage of FIG. 4D is outputted at the output end of the OR gate of FIG. 3.

As described above, suppose that, in the apparatus shown in FIG. 1, the period of the basic signal is 20 $\mu$sec. and the number of interpolations is 400. The period of the interpolation clock is 20 $\mu$sec.÷400=0.05 $\mu$sec. If the period of the phase modulated signal is 18 $\mu$sec, the displacement is (20 $\mu$sec.–18 $\mu$sec.)=2 $\mu$sec. If this displacement is converted into the number of interpolation clocks, 2 $\mu$sec÷0. 5 $\mu$sec.= 40.

In a case where the value of the setter 104 is set in the unit of the period of the reference signal and the period of the basic clock is 0.1 $\mu$sec., the set value (namely, the number of interpolations) is 20 $\mu$sec.÷0.1 $\mu$sec.=200.

The result of division by the above-described displacement is 200÷40=5.

In other words, the period of the clock inputted to the pulse train converter is 0.5 $\mu$sec.×39=19.5 $\mu$sec.

If the next period of the pulse modulated signal is 18 $\mu$sec., the outputted pulse train signal enters the next period before the end of the output of the required number of pulses.

On the other hand, in the second embodiment shown in FIG. 3, the dividend to be inputted to the divider 309 is 18 $\mu$sec.÷0.1 $\mu$sec.=180. The result of division by means of the divider 309 is 180÷40=4.5, in which, if the figures below the first place of decimals are disregarded, the value indicates four. At this time, if 0.1 $\mu$sec.×4×39=15.6 $\mu$sec., the result of division falls within the period (18 $\mu$sec.) of the pulse modulated signal and it will be appreciated that it is a sufficient time duration during which the output of the pulse train can sufficiently be provided.

As another example, if the period of the pulse modulated signal is 15 $\mu$sec., the dividend is 15÷0.1= 150 and the displacement at that time is (20–15) $\mu$sec.÷0.05 $\mu$sec.=100.

The result of division is 150÷100 (whose integer part indicates 1) and the pulse train ends its output at 9. 9 $\mu$sec.

In addition, if the period of the phase modulated signal is 25 $\mu$sec., the dividend is derived as follows: 25÷0.1=250. The displacement is (25–20) $\mu$sec.÷0.05 $\mu$sec.=100. The result of division is 250÷100 and the quotient is 2. The pulse train can be outputted at the period of 19.8 $\mu$sec.

The advantage of the second embodiment is that the period of the pulse train is varied according to the difference in the direction of the period of the pulse modulated signal toward the shortening side or toward the elongating side even if the magnitude of the displacement is the same so that a time averaging is possible.

It is noted that a ROM (Read Only Memory) is applicable to each divider 105 and 309 in the first and second embodiments.

FIG. 10 shows the divider using a ROM table.

As shown in FIG. 10, the upper order address of the memory corresponds to the dividend and the lower order address of the memory corresponds to the divisor.

The quotient is written onto a memory location designated by these lower and higher order addresses. If the ROM is used, the ROM table performs the same function as the divider prepared in terms of a hardware.

In general, it takes a lot of time to calculate the direction so that the whole system processing speed becomes slow.

However, if the previously calculated result is stored using the ROM, the time required to process is only the read time so that it is advantageous to make the system at the high speed. Then, since a small capacity ROM can be used as the ROM, it is costly effective.

It is noted that in FIG. 3, the phase modulated signal is inputted at the terminal of T31, the interpolation clock is inputted at the terminal of T32, the terminal T33 is connected to the A/B phase converter (102 as shown in FIG. 1), and the terminal T34 is connected to the A/B phase converter (102) as shown in FIG. 1.

It is noted that the displacement sensor is exemplified by a U.S. Pat. No. 5,432,443 issued on Jul. 11, 1995, (the disclosure of which is herein incorporated by reference). It is also noted that although the form is different, the A phase and B phase signal are exemplified by a U.S. Pat. No. 4,785,181, (the disclosure of which is herein incorporated by reference).

What is claimed is:

1. A displacement measuring apparatus comprising:

a) a reference signal generator for generating a reference signal;

b) a displacement sensor for generating a displacement signal indicative of a relative displacement of an object to be measured to a reference position at which the reference signal generator generates the reference signal indicating the reference position;

c) a phase modulated signal generator for generating a phase modulated signal indicating a phase difference between the displacement signal generated by the displacement sensor and the reference signal generated by the reference signal generator, the phase difference representing the displacement of the object to be measured with respect to the reference position;

d) a subtractor for subtracting a period of the phase modulated signal which is converted into a number of pulses of an interpolation clock from that of the reference signal which is converted into the number of pulses of the interpolation clock so as to output a direction signal indicating a direction to which the object to be measured is displaced and output a magnitude of the displacement signal indicating the magnitude of the displacement and which is converted into the number of pulses of the interpolation clock;

e) a basic clock generator for generating a basic clock having a predetermined period;

f) a divider for dividing the period of at least one of either the reference signal or the phase modulated signal which is converted into the number of pulses of the basic clock by the magnitude of the displacement signal which is converted into the number of pulses of the basic clock so as to output a multiplier representing the number of pulses of the basic clock per pulse of the interpolation clock;

g) a clock pulse generator for generating a clock pulse having a period corresponding to that of the basic clock multiplied by the multiplier outputted by the divider on the basis of the multiplier; and h) a pulse train converter for receiving the magnitude of the displacement signal from the subtractor and for outputting a pulse train signal whose period is derived on the basis of the clock pulse supplied from the clock pulse generator and the magnitude of the displacement signal.

2. A displacement measuring apparatus as claimed in claim 1, which further comprises an A/B phase converter for receiving the direction signal and the pulse train signal from the pulse train converter and for outputting an A phase signal and a B phase signal.

3. A displacement measuring apparatus as claimed in claim 2, wherein said divider divides the period of the reference signal which is converted into the number of pulses of the basic clock by the magnitude of the displacement signal which is converted into the number of pulses of the basic clock so as to output the multiplier representing the number of pulses of the basic clock per pulse of the interpolation clock.

4. A displacement measuring apparatus as claimed in claim 3, wherein said clock pulse generator comprises a down counter for receiving a preset data signal indicating a quotient of said divider and receiving the basic clock generated and supplied from the basic clock generator and outputting a borrow signal having a period corresponding to the period of the basic clock multiplied by a preset value of the present data signal and an OR gate via which the borrow signal is supplied to said pulse train converter.

5. A displacement measuring apparatus as claimed in claim 4, wherein said pulse train converter receives a pulse generated on a falling edge of the phase modulated signal and the borrow signal outputted from said down counter, sets the number of pulses representing the magnitude of the displacement signal and supplied from said subtractor therein, and outputs the pulse train signal to the A/B phase converter, the pulse train signal outputted by the pulse train converter being the set number of pulses representing the magnitude of the displacement signal supplied from said subtractor in synchronization with the borrow signal supplied from said down counter and the pulse generated on the falling edge of the phase modulated signal.

6. A displacement measuring apparatus as claimed in claim 5, wherein said divider is provided with a setter in which the period of the reference signal is set as a dividend.

7. A displacement measuring apparatus as claimed in claim 6, wherein said predetermined period of the basic clock generated by the basic clock generator is 0.1 microseconds.

8. A displacement measuring apparatus as claimed in claim 7, wherein when the period of the reference signal is 20 microseconds and the number of interpolations is 400, a value set in said setter is 20 microseconds÷0.1 microseconds=200, the quotient of the divider is 200÷40=5, and the period of the borrow signal outputted by said down counter is 0.1 microseconds×5=0.5 microseconds.

9. A displacement measuring apparatus as claimed in claim 8, wherein when the period of the phase modulated signal is 18 microseconds, the magnitude of the displacement signal indicates (20 microseconds−18 microseconds) ÷the period of the interpolation clock (0.05 microseconds)= 40.

10. A displacement measuring apparatus as claimed in claim 2, wherein said divider divides the period of the phase modulated signal which is converted into the number of pulses of the basic clock by the magnitude of the displacement signal which is converted into the number of pulses of the basic clock.

11. A displacement measuring apparatus as claimed in claim 10, which further comprises; a differentiator which provides a differentiated signal on a falling edge of the phase modulated signal; an up counter for incrementally counting the number of pulses of the basic clock generator of said basic clock whenever the differentiated signal is inputted; and a register for latching the counted number of pulses of said up counter in the register representing a ratio between the period of the reference signal and that of the basic clock.

12. A displacement measuring apparatus as claimed in claim 11, wherein said divider receives the latched number of pulses of said up counter in the register as the dividend thereof.

13. A displacement measuring apparatus as claimed in claim 12, wherein when the period of the reference signal is 20 microseconds, the predetermined period of the basic clock is 0.1 microseconds, the number of interpolations is 400, and the period of the phase modulated signal is 18 microseconds, the dividend of said divider is 18 microseconds÷0.1 microseconds=180, the quotient of the divider is 180÷40=4.5=4 (figures below the first place of decimals are omitted), the period of the interpolation clock is 20 microseconds÷400=0.05 microseconds and the period of the clock to be supplied to the pulse train converter is 0.1 microseconds×4×39=15.6 microseconds.

14. A displacement measuring apparatus as claimed in claim 5, wherein said divider comprises a ROM having a table in which the quotient is already written according to its dividend and divisor as an address.

15. A displacement measuring apparatus as claimed in claim 11, wherein said divider comprises a ROM having a table in which the quotient is already written according to its dividend and divisor as an address.

16. A method of measuring a displacement of an object to be measured comprising the steps of:

a) generating a reference signal;

b) generating a displacement signal indicative of a relative displacement of the object to be measured to a reference position at which the reference signal indicating the reference position is generated;

c) generating a phase modulated signal indicating a phase difference between the displacement signal and the reference signal generator, the phase difference representing the displacement of the object to be measured with respect to the reference position;

d) subtracting a period of the phase modulated signal which is converted into a number of pulses of an interpolation clock from that of the phase modulated signal which is converted into the number of pulses of the interpolation clock so as to output a direction signal indicating a direction to which the object to be measured is displaced and output a magnitude of the displacement signal indicating the magnitude of the displacement and which is converted into the number of pulses of the interpolation clock;

e) generating a basic clock having a predetermined period;

f) dividing the period of at least one of either the reference signal or the phase modulated signal which is converted into the number of pulses of the basic clock by the magnitude of the displacement signal which is converted into the number of pulses of the basic clock so as to output a multiplier representing the number of pulses of the basic clock per pulse of the interpolation clock;

g) generating a clock pulse having a period corresponding to that of the basic clock multiplied by the multiplier outputted by the divider on the basis of the outputted multiplier; and h) receiving the magnitude of the displacement signal derived at the step d) and for outputting a pulse train signal on the basis of the clock pulse generated at the step g).

* * * * *